US008645229B1

(12) United States Patent
Buchheit (10) Patent No.: US 8,645,229 B1
(45) Date of Patent: Feb. 4, 2014

(54) SECONDARY MARKETPLACE FOR DIGITAL MEDIA CONTENT

(71) Applicant: Brian K. Buchheit, Davie, FL (US)

(72) Inventor: Brian K. Buchheit, Davie, FL (US)

(*) Notice: Subject to any disclaimer, the term of this patent is extended or adjusted under 35 U.S.C. 154(b) by 0 days.

(21) Appl. No.: 13/713,468

(22) Filed: Dec. 13, 2012

Related U.S. Application Data (63) Continuation of application No. 12/727,952, filed on Mar. 19, 2010, now Pat. No. 8,359,246.

(51) Int. Cl.
    *G06Q 30/00* (2012.01)
(52) U.S. Cl.
    USPC ..................................... 705/27.1; 705/26.1
(58) Field of Classification Search
    USPC ............................................. 705/26.1–27.2
    See application file for complete search history.

(56) References Cited

U.S. PATENT DOCUMENTS

| | | | | |
|---|---|---|---|---|
| 8,484,089 | B1* | 7/2013 | Lin et al. ...................... | 705/26.1 |
| 2004/0268386 | A1* | 12/2004 | Logan et al. .................... | 725/34 |
| 2006/0010075 | A1* | 1/2006 | Wolf ............................... | 705/57 |
| 2007/0130074 | A1* | 6/2007 | Goldstein ...................... | 705/51 |
| 2008/0071617 | A1* | 3/2008 | Ware .............................. | 705/14 |
| 2008/0120311 | A1* | 5/2008 | Reed et al. .................... | 707/100 |
| 2008/0154633 | A1* | 6/2008 | Ishibashi et al. ................. | 705/1 |
| 2008/0195869 | A1* | 8/2008 | Kim et al. ..................... | 713/178 |
| 2008/0319867 | A1* | 12/2008 | Rosenberg et al. ............. | 705/26 |
| 2009/0083541 | A1* | 3/2009 | Levine ........................... | 713/165 |
| 2009/0094165 | A1* | 4/2009 | Royo et al. ...................... | 705/80 |
| 2009/0320144 | A1* | 12/2009 | Fang et al. ....................... | 726/29 |
| 2010/0211968 | A1* | 8/2010 | Itskov et al. ................... | 725/25 |
| 2011/0191246 | A1* | 8/2011 | Brandstetter et al. ........... | 705/59 |
| 2011/0191861 | A1* | 8/2011 | Spears ........................... | 726/28 |

OTHER PUBLICATIONS

"VSDA: First sale should apply to downloads." Video Business. Aug. 14, 2000. [recovered from ProQuest on Dec. 10, 2013].*

* cited by examiner

*Primary Examiner* — Jeffrey A Smith
*Assistant Examiner* — Kathleen G Palavecino
(74) *Attorney, Agent, or Firm* — Patents On Demand P.A.; Brian K. Buchheit; Scott M. Garrett

(57) ABSTRACT

A secondary marketplace acquires an ownership interest in a set of copies of media content items from a set of owners. The owners have previously purchased one or more legal copies of the media content items. The secondary marketplace utilizes the acquired ownership interest in the copies of the media content items to provide potential consumers with a set of digital media content items. A one-to-one correspondence exists between the digital media content items and the copies of the media content items. The secondary marketplace permits the potential consumers to utilize one or more user selected ones of the digital media content items for a fee. A right by the secondary marketplace to permit the potential consumers to utilize the digital media content items is by virtue of the acquired ownership interests in the plurality of copies of the media content items from the owners.

21 Claims, 7 Drawing Sheets

Media Content Marketplace http://www.mediamarket.com — 400

402 — Hello John
404 — 2 items

| Available Items 450 | Media Type 452 | Resale Price 454 | Rights 456 | Digital Format 458 | Output Media 460 | Total Price 462 | 470 |
|---|---|---|---|---|---|---|---|
| Media Item A | music | $ 0.70 | Details | mp3 | mp3 | $ 0.70 | Purchase |
| Media Item B | music | $ 0.70 | Details | mp3 | CD | $ 1.20 | Purchase |
| Media Item C | video | $ 3.99 | Details | mp4 | avi | $ 3.99 | Purchase |
| | | | | | DVD | $ 6.99 | Purchase |
| | | | | | Blu-Ray | $ 9.99 | Purchase |
| Media Item C | ebook | $ 4.50 | Details | pdf | .pdf | $ 4.50 | Purchase |
| Media Item D | game | $ 15.00 | Details | PS2 | PS2 | $ 15.00 | Purchase |

⦿ Provide Digital Media to Marketplace — 480

SECONDARY MARKETPLACE FOR DIGITAL MEDIA CONTENT

CROSS-REFERENCE TO RELATED APPLICATIONS

This continuation application claims the benefit of U.S. patent application Ser. No. 12/727,952 filed 19 Mar. 2010 entitled "SECONDARY MARKETPLACE FOR DIGITAL MEDIA CONTENT". The entire contents of U.S. application Ser. No. 12/727,952 are incorporated by reference herein.

BACKGROUND

The present invention relates to the field of digital media content and, more particularly, to a secondary marketplace for reselling and purchasing digital media content.

Sales of digital only media have been geometrically expanding, marking a shift from traditional physical media sales. Historically, sales of media content occurred in a form bound to a physical media (e.g., book, cassette tape, CD, DVD, etc.). Consequently, a marketplace in which physically bound media was sold focused upon exchanges of tangible objects in which media was embodied. This is no longer the case, as purchases of digital only content are on the rise with the widespread market penetration of e-commerce storefronts such as ITUNES, AMAZON, NETFLIX, and the like.

Digital only media sales have numerous economic, technical, and legal ramifications. Economically, sales of digital only content lowers production, distribution, and warehouse costs. It also speeds time to market. Further, impulse buys and direct advertising are easier for digital only media than for their physically bound counterparts. Negatively, there is an increased concern with digital media proliferation through piracy or other non-sanctioned means.

From a technology end, both good and bad ramifications exist for digital only media. In theory, digital only media never degrades and can retain its original fidelity and utility indefinitely. Digital only media can be moved and/or utilized on any of a variety of devices, which may require format conversions. Digital only media can also be copied and shared—this is a strong concern from a provider's perspective. Digital rights management (DRM) techniques are often implemented to prevent unauthorized sharing and uses.

To date, many problems have resulted from DRM. For example, one DRM measure requires digital only media to periodically communicate with a license server, else the digital only media becomes non-useful. Many significant players in this arena (e.g., MSN MUSIC, YAHOO! MUSIC STORE, FICTIONWISE/OVERDRIVE) have shifted their business model, which have caused them to shut down their DRM servers. Thus, previously purchased digital only content becomes obsolete, as it cannot be used without the existence of the DRM servers. Hardware (i.e., the original ZUNE that lacked "PlaysForSure" support) can become obsolete when DRM schemes for playing digital content change, leaving consumers with expensive and non-useful hardware. Further, a lack of uniformity with DRM has resulted in incompatibilities among popular playback devices—most notably purchased digital only media from some sources are not able to be played on an IPOD, IPHONE, or ITOUCH, which are presently among the most popular products in the market for digital content playback.

From a legal perspective, the predominant form of legal protection for digital only content is copyright law, which is often supplemented by contract law (e.g., shrink-wrap and/or click-wrap licenses). Under defaults of copyright law, a sale of digital only media legally permits a single concurrent use of the media. Thus, the axiom exists that legally, digital only media can be treated like a book. This perspective, which is largely what consumers expect from their purchase regardless of what legal rights they actually receive, would permit digital only content to be loaned to others, to be used in different locations, to be used on different devices, and the like. Deviations from this legal baseline (based on copyright law) enacted through contract law face problems, unless consumers are fully aware of their legal rights—else no true "bargained for exchange" has occurred, which is required by contract law.

A focus of this disclosure is on a secondary marketplace for digital only media, which is not known to exist. That is, traditionally bound media (e.g., fixed in a tangible storage format like a book, a DVD, a CD, etc.) have long permitted reselling of content through a secondary marketplace. Hence, once a purchaser is "tired" of a purchased media object, he/she can offer this media object for resale at a used bookstore, used music store, etc. This transaction historically also incorporates the transfer of usage rights simultaneously to the transfer of the physical expression in which the media is housed—the physical object and usage rights are seen as inextricably bound.

DETAILED DESCRIPTION

As will be appreciated by one skilled in the art, aspects of the present invention may be embodied as a system, method or computer program product. Accordingly, aspects of the present invention may take the form of an entirely hardware embodiment, a software embodiment (including firmware, resident software, micro-code, etc.) where the software embodiment can include a storage medium (which can be a tangible, physical, non-transitory storage medium) within which the software resides, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer program stored on a computer readable storage medium may be propagated over a distance via a computer readable signal medium.

The computer readable storage medium can be a tangible, non-transitory medium. The computer readable storage medium can be a physical device or part of a physical device in which information is digitally encoded. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
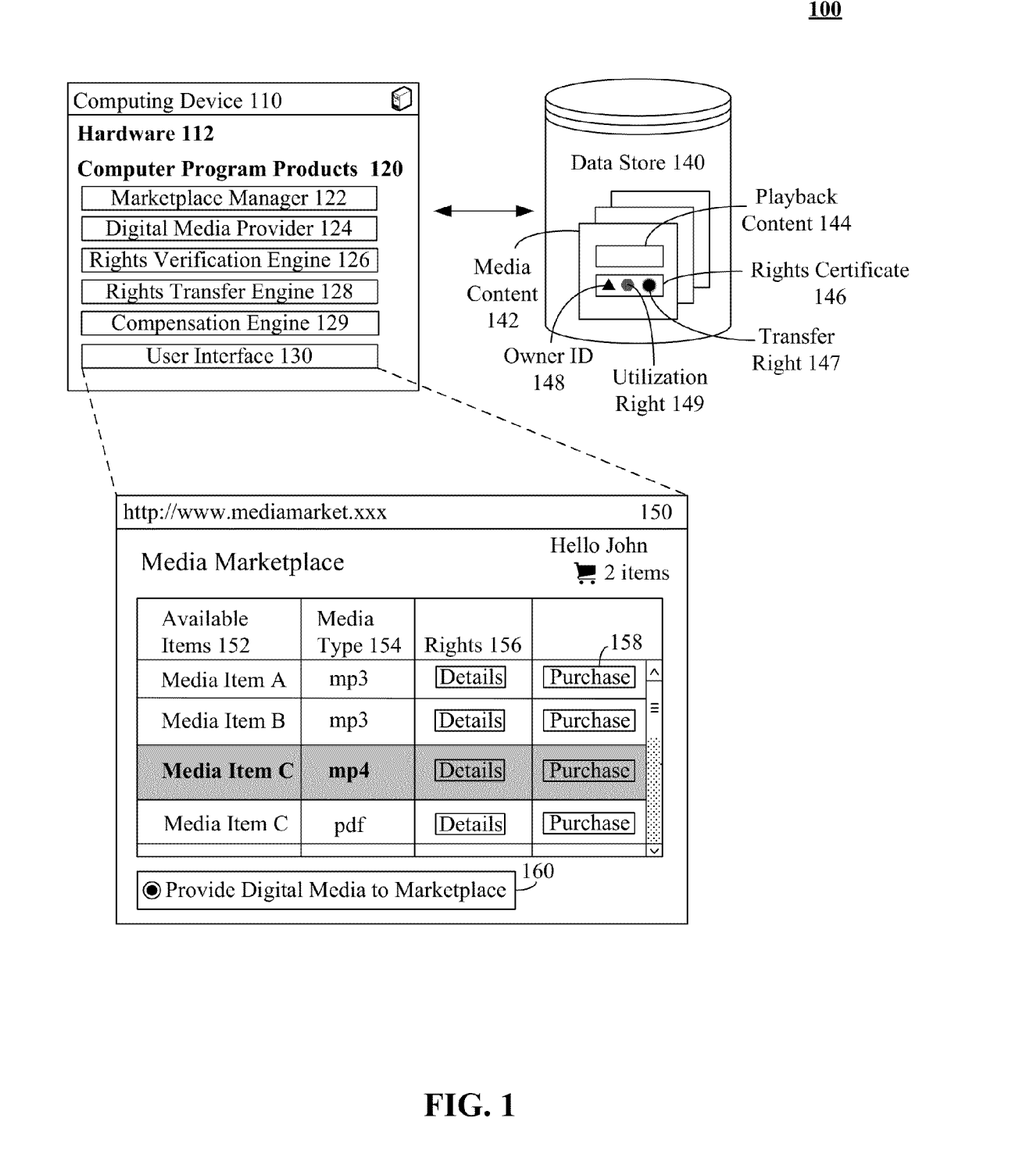
FIG. 1 is a schematic diagram of a system 100 for establishing a secondary marketplace for digital media content in accordance with an embodiment of the disclosure.

FIG. 1 is a schematic diagram of a system 100 for establishing a secondary marketplace (e.g., item 150) for digital media content 142 in accordance with an embodiment of the disclosure. The secondary marketplace refers to a marketplace within which a reseller, who is not a media provider, has rights (e.g., item 146) for a copy of digital media content 142. These rights (146) can include a transfer right 147, and utilization right 149, a right to copy, a broadcast right, and the like. IN one embodiment, the transfer right 147 can include multiple lower level rights, such as different permission levels for this right, durations, restrictions, encoding, a right to reformat, a right to modify fidelity, a right to embody within specific tangible medium types (DVD, BluRay, flash memory, etc.), and the like.

At least a portion of the rights 146 can be transferred one entity to another via the secondary marketplace. Thus, a purchaser is able to purchase existing rights (146) to media content 142 from an authorized owner (or rights holder) that is not an original content provider (i.e., the rights holder unlike the provider is not permitted to create new rights to the media content 142, but is instead able to shift ownership interests in existing rights 146 to the content 142). An original content provider can utilize and/or partner with distribution channels, such as known e-commerce storefronts like ITUNES, AMAZON, NETFLIX, BLOCKBUSTER, etc.

The secondary marketplace can take many forms including an e-commerce site 150, a kiosk, a physical storefront, an auction house, etc. In one embodiment, the secondary marketplace can list available media items 152, an associated media type 154 or encoding format, a set of ownership rights 156 (which can be established by a rights certificate 146), and a mechanism 158 to purchase the media content 142. The secondary marketplace can also permit a user to provide 160 new digital content items to the marketplace for purchase by another.

As shown in FIG. 1, the user can access the secondary marketplace via a computing device 110. This device 110 can include a number of computer program products 120 including a marketplace manager 122, a digital media provider 124, a rights verification engine 126, a rights transfer engine 128, a compensation engine 129, a user interface 130, and the like. The computer program products 120 can be stored in a tangible storage media (part of hardware 112) and can be executed and/or manipulated (for non-executables) using hardware 112. Hardware 112 can include a processor, one or more memories (tangible storage mediums), a network transceiver, input/output peripherals, and a bus communicatively connecting hardware 112 components to each other.

The marketplace manager 122 can maintain accurate records of media content 142 information. When resales are made via the secondary marketplace, the marketplace manager 122 can oversee the transaction as the user provides media to the secondary marketplace, effectively returning the media to the digital media provider 124 via user interface 130. The digital media provider 124 can access data store 140 containing media content 142 elected for resale. The rights verification engine 126 can substantiate the authenticity of the user's transfer right 147 of media content 142, as well as the owner ID 148 and rights certificate 146.

Once a sale or transfer of rights 156 has transpired via the secondary marketplace, the compensation engine 129 can ensure proper credit or payment is made. For example, a purchaser can financially compensate an original owner for the transaction, where an optional surcharge is paid to the secondary marketplace for facilitating the transaction. In one embodiment, the secondary marketplace can purchase media content 142 from an original owner, and then resell it to a purchaser as a rights holder having transfer authority. In one embodiment, the purchaser can include an entity that desires to take the media content 142 out of circulation, and is willing to pay a fee to dispose of the rights 146, in which case the secondary marketplace (e.g., the rights transfer engine 128) may ensure the rights 146 are destroyed in accordance with directives of the purchasing entity.

Once a resale transaction completes involving the media content 142, a new owner can be provided access to purchased media content 142 and an original owner (reseller) can be denied access to the sold media content 142. This can involve a copying and/or deletion of the media content 142 within one or more data stores 140 to which the purchaser and sellers have access. The data store 140 can be internal to device 110 or can be external (e.g., stored on a removable media, stored in a network data store accessible via a network), etc. In one embodiment, the media content 142 can be disabled/enabled, as opposed to deleted/copied as a result of the transaction completion. In one embodiment, only a portion of the rights 146, 156 can be involved in a secondary marketplace transaction, in which case the original rights holder can retain unsold rights (146, 156) to the content 142 and the purchaser can be granted a set of rights (146, 156) to the content 142 in accordance with transaction details.

In one embodiment, a resale transaction of media content 142 can result in Digital Rights Management (DRM) information of the content 142 being changed, so that the content is only usable upon a specific device 110 or by the new rights holder (e.g., the purchaser). In one embodiment, a resale transaction of the media content 142 can result in a digital watermark being added to the media content 142, so that an identity of a purchaser and/or of a purchasing device 110 is recorded in the added digital watermark. Correspondingly, any digital watermark information relating to an original purchaser of the media content (e.g., the seller) can be optionally removed.

The media content 142 can include playback content 144, which is the content able to be presented to an authorized user. In one embodiment, various digital media rights (DRM) can be optionally associated with the media content 142 as well. The various computer program products 120 can alter this DRM information during a resale and rights transfer process. For example, information in a rights certificate 146 and/or an embedded owner identifier 148 can be updated to reflect the purchaser's identity and/or newly established privileges consistent with the purchased rights 156. Similarly, access rights 149 can be updated to deny the reseller access to the playback content 144 once the transaction has been conducted.

Media content 142 can include videos, audio files, audio books, songs, pictures, e-books, video games, productively software, and the like. Media content 142 can be conveyed within a carrier wave (a signal medium), within a tangible storage medium (e.g., a physical object in which the media content is encoded), or not at all during a transaction involving the secondary marketplace. That is, the secondary marketplace does not necessarily provide the tangible storage medium in which the digital only media content is ultimately stored (recognizing that digital only content must be stored in some tangible storage medium). For example, a purchaser/seller can have the content 142 transferred to/from a tangible storage medium owned by the purchaser/seller as part of the secondary marketplace transaction. Thus, media content 142 can be conveyed to a purchaser over a signal medium, which is a transitory medium in which a data encoded carrier wave is conveyed between two physically separated points in space.

In one embodiment, media content 142 sold to the secondary marketplace for resale may not be transferred (via a carrier wave or a tangible storage medium) to the secondary marketplace from an original source. Instead, the rights 146, 156 or a portion thereof to the media content 142 may be legally transferred. The secondary marketplace can acquire the media content 142 from any source, once the legal rights are conveyed.

In one embodiment, the purchasing of the media content 142 from the secondary marketplace, may not involve the transfer (via a signal medium or a tangible storage medium) of the content 142 from the secondary marketplace to a purchaser. Instead, rights 146, 156 or a portion thereof of the media content 142 may be legally transferred during a secondary marketplace transaction. A purchaser can acquire the media content 142 from any source, once the legal rights are conveyed.

In one embodiment, an end-to-end transaction involving the secondary marketplace may be non-parallel. For example, a seller may provide media content 142 on a tangible storage medium, while a purchaser is provided the media content 142 (along with the rights 146, 156) via a transitory medium, such as a carrier wave, where the conveyed content is thereafter stored on a tangible storage medium owned by the purchaser (e.g., a flash drive, a memory of a device 110, a network memory accessible by the purchaser, etc.). In another example, the seller may provide a right to use 146, 156 media content 142 to the secondary marketplace (such as providing a scratched DVD, CD, etc. that cannot be read, yet which embodies a legal right) without providing the content to the secondary marketplace, where the purchaser is provided a tangible storage medium (e.g., can be provided the purchased media content on a burned DVD, CD, etc.) including the media content 142 from the secondary marketplace along with the rights 146, 156 to use the media content 142.

It should be emphasized that the rights 146, 156 involved in a secondary market transaction need not be a comprehensive set of rights possessed by a seller. For example, a set of rights 156 can include a streaming media right and a persistent single right to use a specific media content 142 item. A seller, via the secondary marketplace (e.g., site 150) may limit the for sale rights to streaming rights, thus the user never permanently relinquishes their rights to the media content 142. Similarly, a time-expiring right to use the content 142 can be transacted through the secondary marketplace. Thus, the "seller" is renting or leasing their rights to use the digital media content 142 to a purchaser for a fixed and limited period of time via the secondary marketplace. This illustration of the bifurcation or separation of rights 146, 156 is not intended to be comprehensive and any division of rights is contemplated and enabled via the secondary marketplace.

Figure 2:
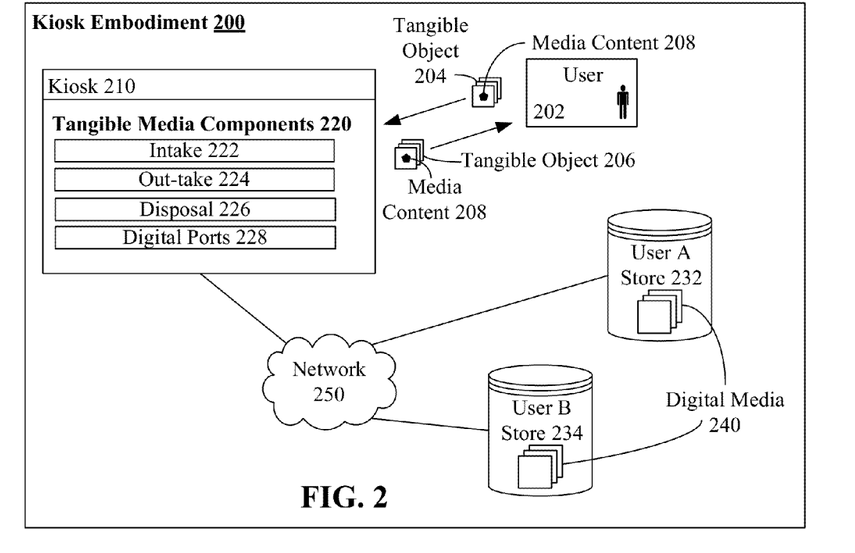
FIG. 2 is a schematic diagram of kiosk embodiment 200 for a secondary marketplace for digital media content in accordance with an embodiment of the disclosure.

FIG. 2 is a schematic diagram of kiosk embodiment 200 for a secondary marketplace for digital media content in accordance with an embodiment of the disclosure. The kiosk 210 can be utilized by a user 202 in a variety of fashions to acquire or relinquish rights to media content 208. For example, in one embodiment, a user 202 can feed the kiosk 210 tangible object 204, such as a CD, DVD, book, or provide access to a drive such as a USB, which contains media content 208 for resale at the secondary marketplace. The tangible object is a media item containing media content 208 previously owned by user 202 that he or she wishes to resell to another user of the secondary marketplace. Kiosk 210 can include a number of tangible media components such as an intake 222, out-take 224, a disposal mechanism 226, digital ports 228, and the like.

The intake mechanism 222 allows appropriate avenues for user 202 to provide kiosk 210 with tangible objects 204. When input of a tangible object is detected, intake 222 can launch a user interface to prompt the user 202 for account identification information or selections based on user specific goals for the kiosk fed media content 208. Alternatively, intake 222 can be accessed at any time after the user 202 has begun interacting with the kiosk terminal 210. Out-take 224 allows the kiosk to function as a storefront of tangible objects 206 containing media content 209 which a user 202 has purchased from the secondary media content marketplace and elected to receive in the form of a tangible object 206.

Disposal mechanisms 226 ensure that once a user 202 has re-sold his or her media content 208 to the secondary marketplace, tangible object 204 containing user 202's copy of media content 208 is disposed of. This prevents unauthorized use of digital media content 208. User 202 may selectively engage in a partial surrender of media content 208 stored on tangible object 206 (i.e., the user may decide to re-sell one song off a CD, a chapter of an anthology from a book, temporarily "rent" out a DVD, and the like). Disposal 226 can be adjusted according to the user specific selection of the resale made.

Digital ports 228 can function as either intake 222 or outtake 224 components (i.e., a user 202 may provide or receive media content 208-209 to or from kiosk 210 via, for example, an external drive, a smartphone, or the like).

In one embodiment, user 202 provides kiosk 210 with tangible object 204 containing media content 208 via the intake mechanism 222 or digital ports 228. Kiosk 210 allows the user to make selections regarding how much of the media content 208 he or she wishes to provide for resale to the secondary marketplace (to re-iterate, user 202 may decide to resell one track on a CD, a selection of tracks, or all tracks on the CD). According to user 202 inputs, kiosk 210 selectively disposes (226) of the tangible object 204 containing the resold media content 208, provides the resold media content 208 to the secondary marketplace and transfers credit or payment to user 202 for the resold media content 208. When a partial sale occurs (e.g., selling one song from an album), only the sold song can be disabled as a result of the secondary marketplace transaction (e.g., the song can be removed from a user's 202 media player, optical media 204 containing the song can be burned or altered by kiosk 210 to prevent playback of that song, etc.).

In another embodiment, user 202 can also employ kiosk 210 to "trade in" tangible object 204 containing media content 208, purchase extra rights or relinquish a subset of rights and elect to receive a new form of tangible object 206 containing media content 209. In this sense, tangible object 204 may or may not be the same format as tangible object 206. For example, user 202 approaches kiosk 210 and provides a CD (tangible object 204) to resell a specific track (media content 208) on that CD. The disposal mechanism simply "removes" that specific track (208) off of user 202's CD (204) and returns user 202's CD (204) via the out-take mechanism.

An example of a "trade in" utilizing the kiosk 210 is as follows: a user 202 feeds kiosk 210 a DVD (tangible object 204) of Star Wars IV (media content 208). Through selections at the kiosk 210 interface, the user 202 may select to receive another DVD (tangible object 206) of modified content Star Wars IV-Remastered (media content 209) or a Blu-Ray Disc (tangible object 206) of Star Wars IV (media content 208). This illustration of "trade ins" of tangible objects (204-206) containing media content (208-209) is not intended to be comprehensive and any variation of "trade ins" is contemplated and enabled via the secondary marketplace.

In yet another embodiment, user 202 may utilize kiosk 210 to access his or her user specific data store (232, 234) associated with the secondary marketplace via network 250 to retrieve previously purchased media content in the form of tangible object 206 containing media content 209. User 202 can also utilize kiosk 210 to engage in the resale process of a digital media 240 item stored on his or her user specific data store or purchase media content 209 available for purchase through another user's data store (232, 234) via the secondary media content marketplace.

In one embodiment (alluded to by the Star Wars IV example above), a user 202 may sell and purchase effectively the same media content during a secondary marketplace transaction, just the transaction involves an exchange of rights to that content. For example, a user 202 may have IPOD rights to a low-fidelity version of Star Wars IV and desire to receive a high-definition version of Star Wars IV (possibly a re-mastered or different version) encoded on a BLU-RAY disk. The secondary marketplace can permit this type of transaction. For example, in one embodiment, the secondary marketplace can already possess one extra right to the high-definition version of Star Wars IV encoded on a BLU-RAY disk, which it sells to the user 202. The user 202 is given an amount of "credit" towards this purchase based on providing the low-fidelity version of Star Wars IV to the secondary marketplace, which may thereafter be sold to a different user as part of a different secondary marketplace transaction.

Figure 3:
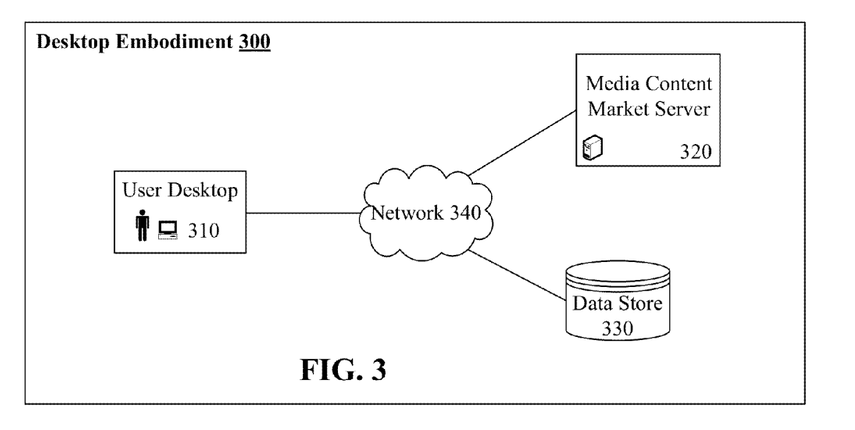
FIG. 3 is a schematic diagram of a desktop embodiment 300 for a secondary marketplace for digital media content in accordance with an embodiment of the disclosure.

FIG. 3 is a schematic diagram of a desktop embodiment 300 for a secondary marketplace for digital media content in accordance with an embodiment of the disclosure. User Desktop 310 can interact with the media content market server 320 and an associated data store 330, both accessible via a network 340. Through this arrangement, the same type of transactions detailed in embodiment 200 can occur.

Variants to embodiments 200 and 300 are contemplated. For example, tangible objects 204 can be exchanged via the assistance of a postal mail service, which is conveyed to/from a location associated with media content market server 320. Records of the server 320 can be updated whenever the tangible objects 204 containing the digital media are conveyed.

Figure 4:
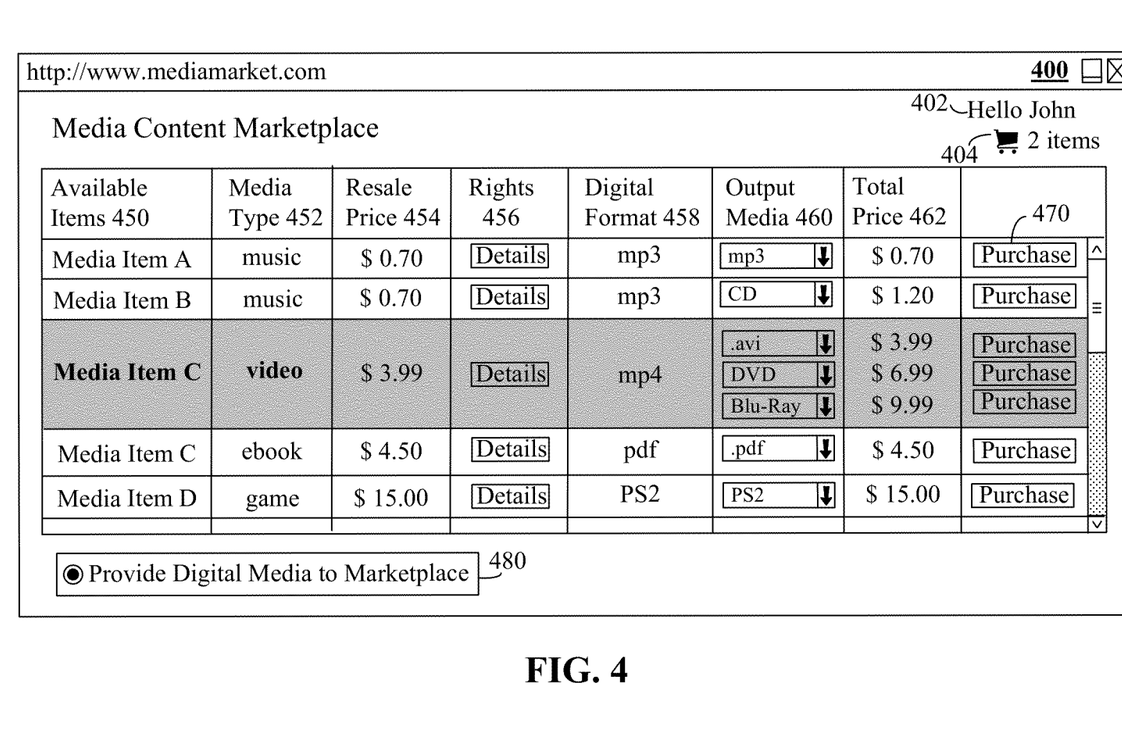
FIG. 4 shows a user interface 400 representing an e-commerce media storefront embodiment of a secondary digital media marketplace in accordance with the disclosure.

FIG. 4 shows a user interface 400 representing an e-commerce media storefront embodiment of a secondary digital media marketplace in accordance with the disclosure. The e-commerce storefront can include user specific accounts (indicated in interface 400 by a welcome screen and acknowledgment of user identity 402) as well as user specific shopping carts 404 for selected media content items for purchase. It should be noted, that as in common e-commerce storefronts, user accounts allow all levels of customization for preferences, as well as the user selectively saving items to shopping carts for later access/purchase.

The e-commerce storefront interface 400 can present users with available items 450 for purchase, associated media types 452, assigned resale prices 454, which display prices before user modification of selections, associated rights to use 456, digital format 458 for the assigned resale price, output media 460 available, the subsequent total price 462 of the selected item 450, and the like. Moreover, the interface 400 can present a purchase mechanism 470 that can place selected items in the user cart for purchase after the user has configured the options for the selected available media content 450.

Available media content can be any digitally encoded media, such as songs, video, games, ebooks, smartphone applications, etc. The resale price 452 can be a standard set by the secondary marketplace for a variety of specific base items, altered by user options such as an expansion or reduction of associated rights 456, output media 460 selected, and the like. The e-commerce secondary media content marketplace can also allow users the option 480 to provide media content to the marketplace for resale.

It should be emphasized from interface 400, that different rights 456 can be for sale for the same media content (e.g., Media Item C), where different rights 456 may have different resale prices 454 associated. Similarly, a set of different formats 458 can exist for the same media content. In one embodiment, different formats 458 can be associated with different costs (e.g., a loss-less format may be more expensive than a lossy format). Similarly, the output media 460 can be optionally selected via the interface 400. The output media can include different selectable media formats, different tangible storage devices upon which the media content can be encoded, and the like. The total price 462 can reflect a base price for the media (464) plus or minus any adjustments incurred by modifying the default rights 456, format 458, and output form 460. Shipping costs can be optionally incurred when physical media is selected 460, which have to be shipped to a purchaser. In one embodiment, different prices can be explicitly shown in the interface 400 for a set of different user selectable options (see media item C showing an .avi cost, a DVD cost, and a Blu-Ray cost for the media content). In one embodiment, multiple purchases (and multiple instances of rights) can be concurrently purchased via interface 400—even for the same media content item (such as Media Item C).

Figure 5:
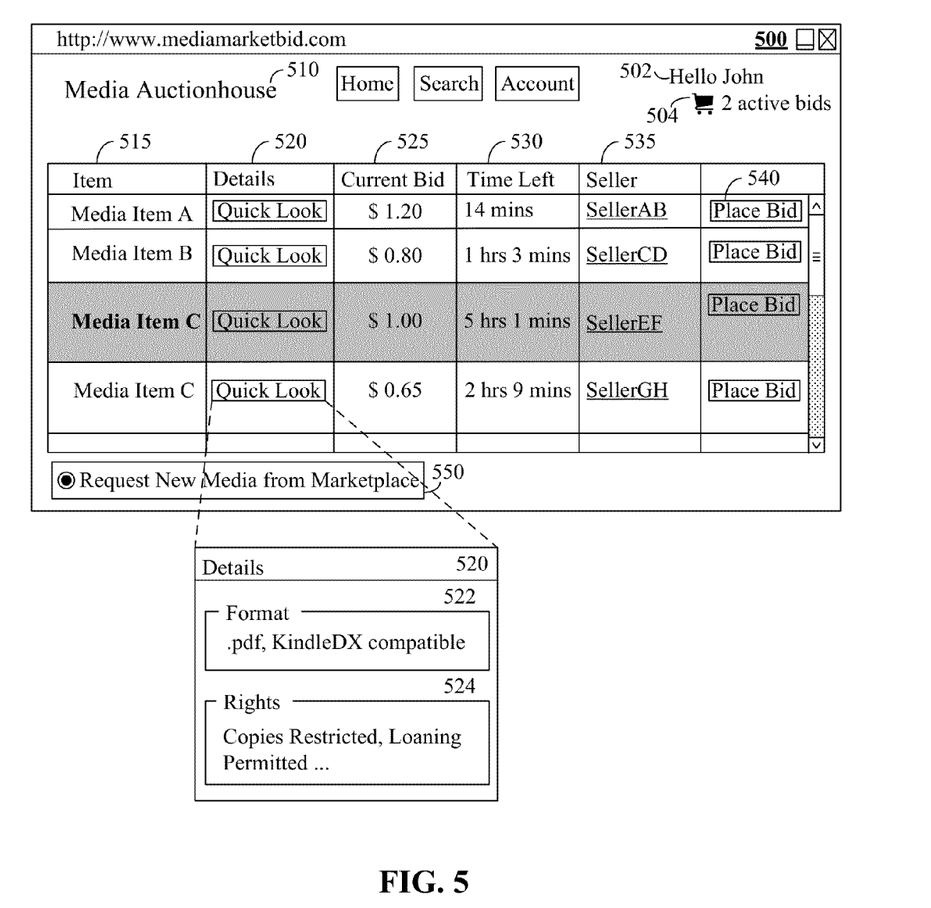
FIG. 5 shows a user interface 500 representing an e-commerce auction house embodiment of a secondary digital media marketplace in accordance with the disclosure.

FIG. 5 shows a user interface 500 representing an e-commerce auction house embodiment of a secondary digital media marketplace in accordance with the disclosure. In one embodiment, the auction house can enable users to resell and purchase "used" digital media content with associated rights directly from other users of the secondary media content marketplace without using the secondary marketplace as a direct and involved intermediary between buyer and seller. Here, rather than buying "used" media content from a user and providing it for resale to another user, the secondary marketplace can act as a forum or platform for buyers and sellers to conduct their transactions directly with one another (much like EBAY).

In one embodiment, the media auction house 510 can allow users to access their specific media auction house account (e.g., 502), follow items of interest and conduct transactions by participating in bids or other options, such as "buy it now", and the like (e.g., 504). The e-commerce media auction house can present a set of information about available media content items 515, which can be a compilation of marketplace auction house user entered items for resale, and include items for resale in the e-commerce storefront regulated by the secondary media content marketplace, or a combination thereof. Each item 515 can be associated with user generated or default details 520 regarding the specific item 515. These details can include but are not limited to format information 522 and item specific rights information 524. Any of these user generated details 520 can be verified by the secondary media content marketplace.

Other information regarding the resale media content items 515 can also be displayed such as current bid amounts 525, time left 530 in the item specific auction, seller profile information 535, as well as a mechanism to participate in the auction house marketplace by placing a bid 540. Seller profile information can include factors such as feedback from previous purchasers, resale history, library information to facilitate users requesting new media to be resold that is not currently available for resale through the media content auction house (e.g., 550), and the like.

Figure 6:
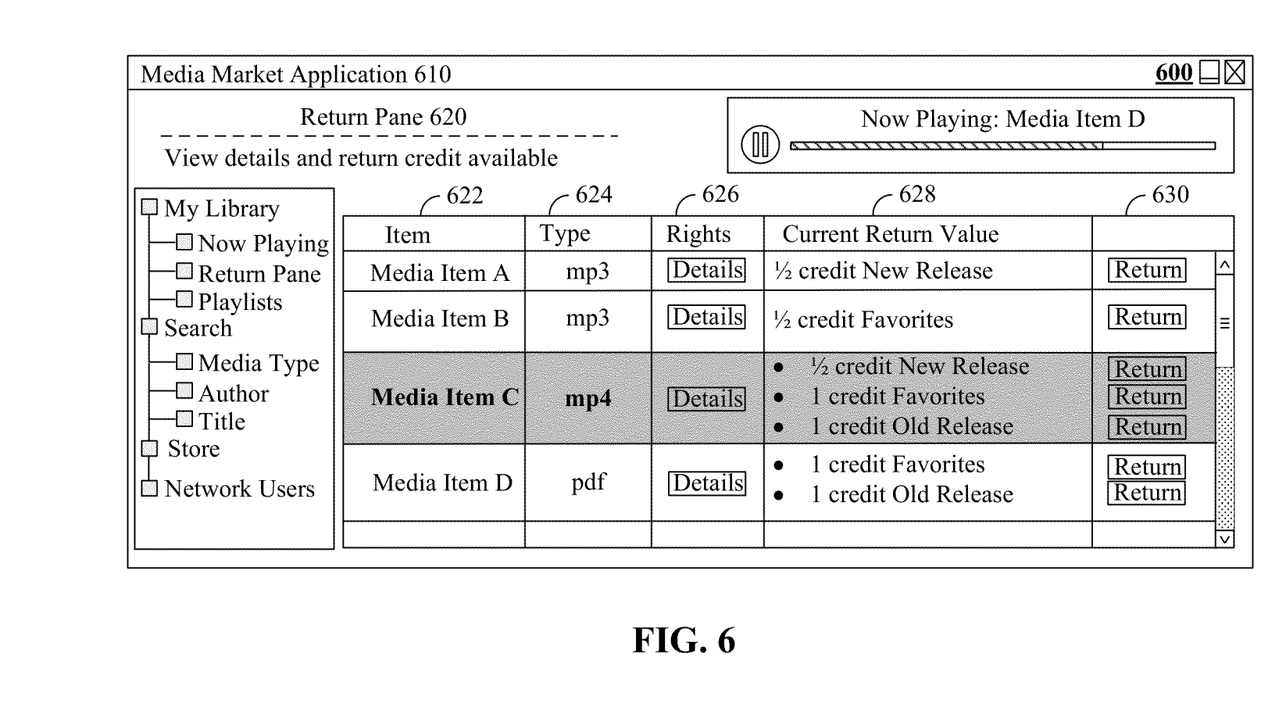
FIG. 6 shows a user interface 600 representing a media storefront marketplace for "used" digital media incorporated into a user's digital library software in accordance with an embodiment of the disclosure.

FIG. 6 shows a user interface 600 representing a media storefront marketplace for "used" digital media incorporated into a user's digital library software in accordance with an embodiment of the disclosure. User oriented media programs such as e.g., ITUNES, incorporate "stores" for instant download of selected media items directly through the user's digital library interface. The secondary media market interface 600 presents an option for users to conveniently "return" previously purchased media to the "store" within their media market application 610, which in turn can resell the media content to another user. As such, a return pane 620 is included which functions as a reverse storefront for media content in these user oriented media programs.

The return pane 620 can include a listing of all media items 622 in the user library, their associated type or format 624, usage rights 626 associated with the media item 622, a display for current return value 628, and a mechanism 630 for returning the selected media content to be resold in the secondary marketplace. The assigned current return value can be media item specific as well as highly flexible depending on factors such as popularity of an item, time since its release, the availability of remastered/remixed/new editions, and the like. The value may be selectively displayed in currency amounts as well as "trade in" credits that may vary according to media categories (e.g., new releases, user favorites, etc.) as is highlighted in interface 600.

In another embodiment, additional information can be included as part of the return pane 620, such as e.g., the date the item was originally acquired, play counts, the date the item was last accessed, an update engine which can display new versions of the media item available (e.g., remastered editions of videos, remixes of songs, new editions of books), and the like. The return pane can also, in another embodiment, allow for partial surrender of rights to a user owned item as well as allow renting, i.e., allow for time constrained streaming, of other users' media. It should be noted that this listing is not comprehensive and any division of rights, temporary relinquishment of rights, or resale of rights to a media content is contemplated.

Figure 7:
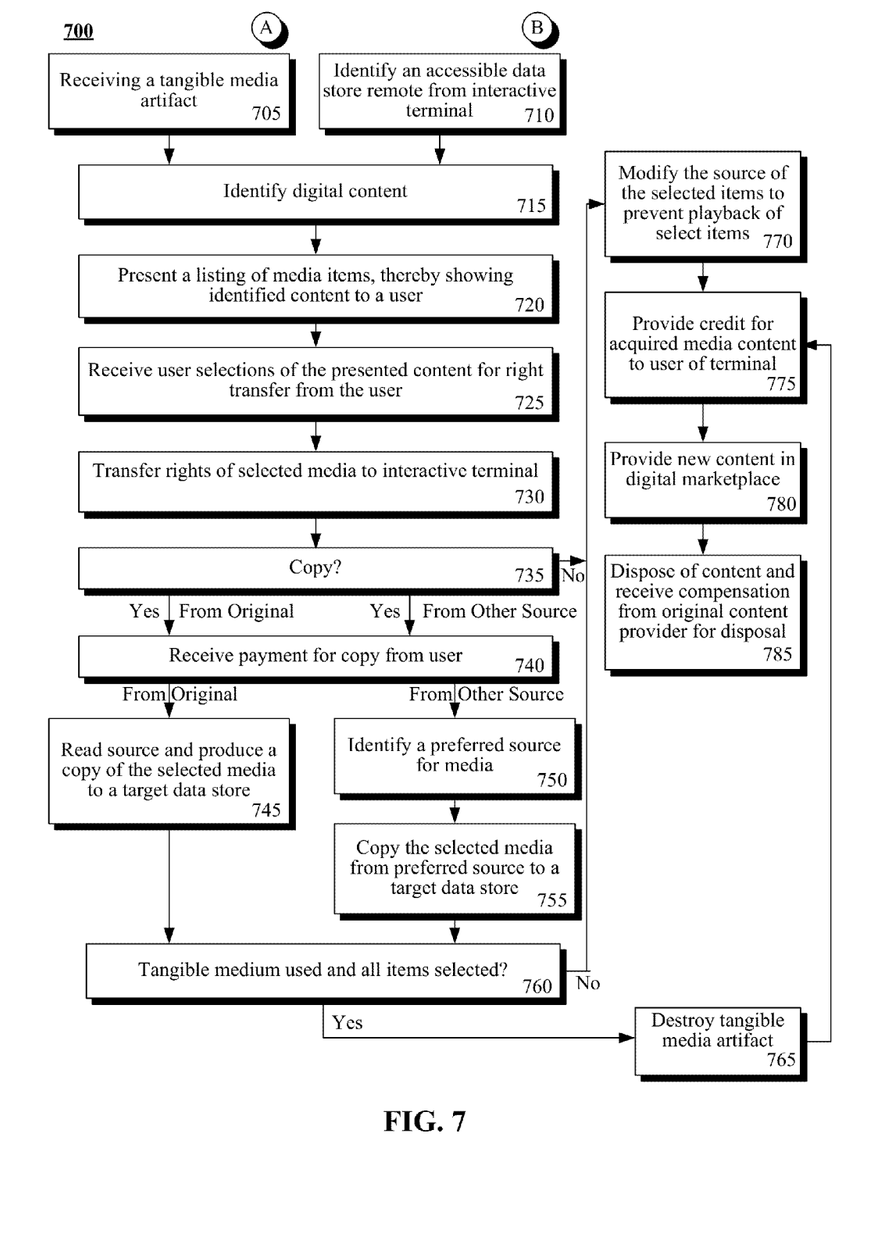
FIG. 7 is a flowchart of a method 700 from a seller perspective through which an embodiment of the invention processes the resale transfer of digital media content and associated rights from one user (i.e., seller of previously purchased digital media) to the marketplace for purchase by another user in accordance with an embodiment of the invention.

FIG. 7 is a flowchart of a method 700 from a seller perspective through which an embodiment of the invention processes the resale transfer of digital media content and associated rights from one user (i.e., seller of previously purchased digital media) to the marketplace for purchase by another user in accordance with an embodiment of the invention. In this embodiment, the secondary media content marketplace interactive terminal can either receive 705 a tangible media artifact or identify 710 an accessible data store remote from the interactive terminal.

The interactive terminal then identifies (715) digital content available on either the tangible media artifact or the remote data store provided by or indicated by the user of the interactive terminal. The terminal goes on to (720) present a listing of media items, thereby displaying identified content for resale or purchase to a user. Once the interactive terminal receives (725) user selections of the presented content available for rights transfer from the user to the terminal (this indicates a resale), the terminal implements (730) a transfer of rights of the selected media to the interactive terminal (i.e., the secondary media content marketplace). The terminal prompts (735) the user if he or she is seeking to maintain a copy of the selected media.

Should the user select not to receive a copy, the source can be optionally modified (770) and the interactive terminal can provide (775) the user of the interactive terminal with credit for the newly acquired media content for resale. The terminal further provides (780) the new content in the secondary media content marketplace, or alternatively disposes (785) of content and allows for the receipt of compensation from the original content provider for the disposal.

Should the user select to receive a copy of the media content he or she provided to the secondary media content marketplace, the interactive terminal will prompt (740) the user for payment of the copy after identifying the specific type of copy desired by the user. The user can choose to receive a copy from the original content provided, in which case the terminal reads (745) the source file and produces a copy of the selected media to a target data store.

Alternatively, the user can choose to receive a copy from another source. Should this be the case, the terminal will identify (750) a preferred source for the media. The preferred source may be identified in a variety of fashions, such as user selection, historic user selection patterns, best available quality determined by interactive terminal, and the like. After the terminal has identified the source for the copy of the user selected media, it will engage (755) in copying the selected media from the preferred source to a target data store. The target data stores for steps 745 and 755 may be the user specific data stores associated with the secondary media content marketplace or user selected data stores accessible via a network.

Following the copying process for the user, the interactive terminal performs a check as to whether or not the user provided (760) tangible medium and all items on the tangible medium were selected for resale. If a tangible medium was used and all items were selected, the interactive terminal will proceed to destroy (765) the tangible media artifact. If a tangible medium was used and not all media content items were selected for resale, the interactive terminal will engage in a select disposal by modifying (760) the source of the items that were selected for resale to prevent playback of only those selected items.

Subsequently, the source can be optionally modified (770) and the interactive terminal will provide (775) the user credit for the terminal acquired media content, provide (780) the new content in the secondary media content marketplace, or dispose (785) of the acquired content to prevent access and playback by unauthorized users and thereby allow for receipt of compensation from the original content provider for the disposal.

Figure 8:
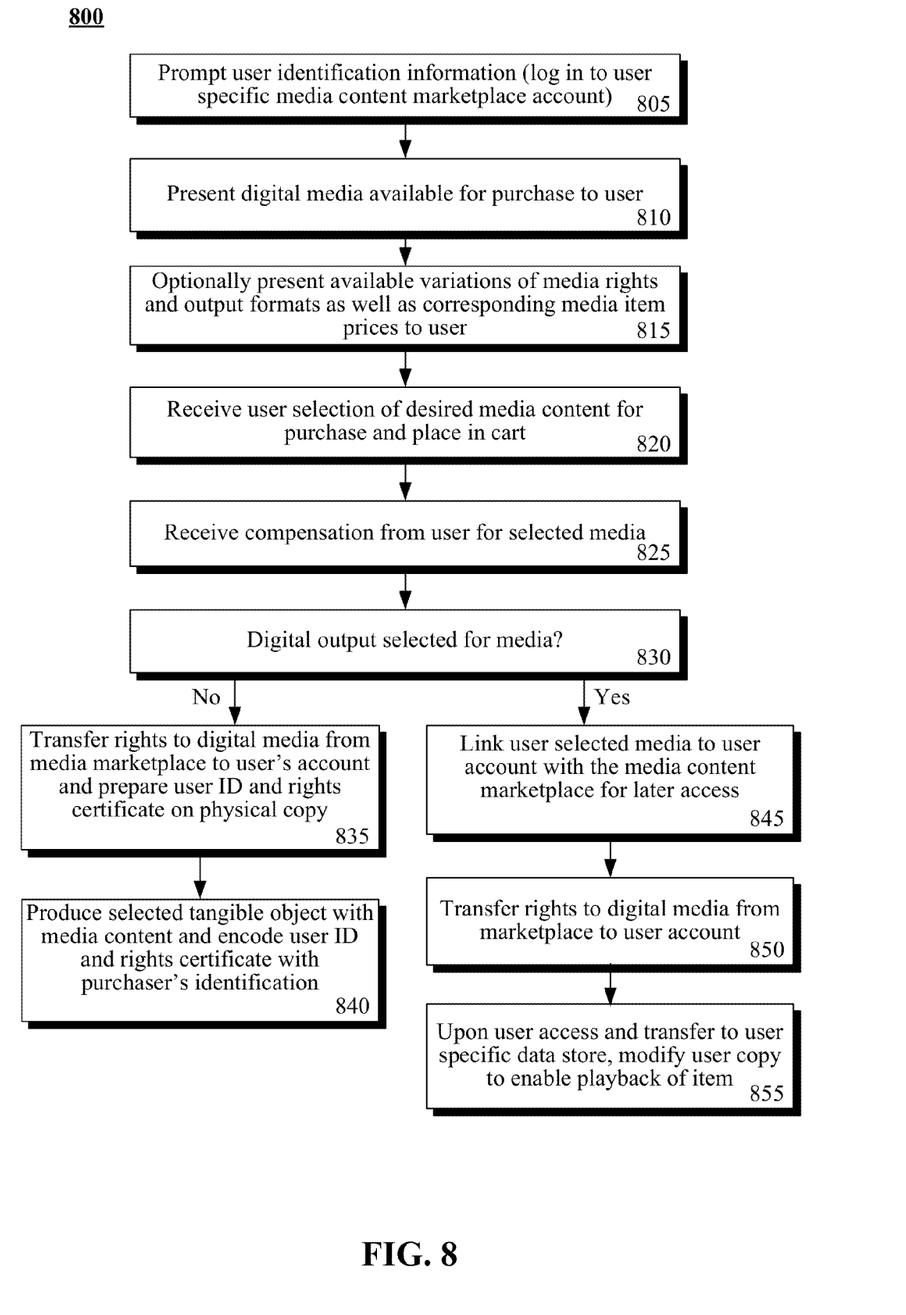
FIG. 8 is a flowchart of a method 800 from a user perspective that allows for the purchase and transfer of digital media content and associated rights from the seller (i.e., marketplace) to the purchaser of the marketplace provided "used" digital media in accordance with an embodiment of the disclosure.

FIG. 8 is a flowchart of a method 800 from a user perspective that allows for the purchase and transfer of digital media content and associated rights from the seller (i.e., marketplace) to the purchaser of the marketplace provided "used" digital media in accordance with an embodiment of the disclosure. In the embodiment described, upon user access, the interactive terminal can prompt (805) the user for identification information, i.e., the terminal prompts the user to log in to his or her specific secondary media content marketplace account.

Subsequently, the interactive terminal can present (810) the user with digital media (i.e., media content) available for purchase via the secondary media content marketplace. Optionally, the interactive terminal can present available variations of media rights and output formats as well as corresponding media item prices depending on the raw materials, conversions, etc necessary to produce the available variations of media content and possible tangible items containing the media content.

Upon receiving (820) a user selection of desired media content for purchase and placing it in the user's cart, the interactive terminal can prompt the user for payment and receive (825) compensation from the user for the selected media content. Furthermore, the interactive terminal can perform a check as to whether or not the user selected (830) digital output for the acquired media.

Should the user have not selected a digital output, but rather output via a tangible item containing the acquired media content, the interactive terminal can perform the following steps: Initially, the terminal can transfer (835) the rights to the digital media from the media marketplace to the user's account and prepare the user ID and rights certificate for the requested physical copy. Additionally, the terminal can produce (840) the selected tangible object with the user acquired media content and encode the user ID and rights certificate with the purchaser's information.

Alternatively, should the user have selected to receive the selected media content in digital form, the interactive terminal can link (845) the user acquired media content to the user's account with the media content marketplace to allow the user access at a later time. Moreover, the terminal can transfer (850) rights to the media content from the media content marketplace to the user's account. Upon user access (855) and transfer of the acquired media content to the user specific data store, the user copy can be modified to enable playback of the acquired media content.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
a second owner obtaining a plurality of portable storage mediums from a set of one or more first owners, wherein each of the portable storage mediums comprises a copy of a media content item, wherein media content items stored on the portable storage mediums are subject to a copyright of at least one copyright holder, wherein legal possession of the portable storage mediums represents ownership of a utilization right for the media content items stored therein;
the second owner acquiring an ownership interest in a plurality of copies of media content items stored in the plurality of portable storage mediums from the set of one or more first owners via a transfer of ownership of the portable storage mediums between the second owner and the set of one or more first owners, wherein the first owners have previously purchased one or more portable storage mediums comprising legal copies of the media content items, whereby a first sale doctrine of copyright law or other provision of law exhausts a copyright holder's right to control how ownership of purchased legal copies of the portable storage mediums comprising the plurality of copies of the media content items is able to be disposed of, thereby permitting the owners to convey ownership interest in the portable storage mediums comprising the plurality of copies of the media content items to second owner;
a secondary marketplace utilizing the acquired ownership interest of the second owner in the plurality of copies of the media content items to provide, via one or more computing devices, potential consumers with a set of digital media content items, wherein a one-to-one correspondence exists between the digital media content items and the copies of the media content items, wherein the secondary marketplace provides the potential customers with the set of digital media content items without any of the portable storage mediums obtained from the set of one or more first owners being conveyed to the potential customers, wherein the secondary marketplace legally provides the set of digital media content items to the potential customers without obtaining permission from the first owner or from any other right-holding-entity, said other right-holding entity being an entity having an acquired or retained copyright right to the media content items; and
the secondary marketplace, via one or more computing devices, permitting the potential consumers to utilize one or more user selected ones of the digital media content items for a fee, wherein a right by the secondary marketplace to permit the potential consumers to utilize the digital media content items is by virtue of the acquired ownership interests of the second owner in the plurality of copies of the media content items.

2. The method of claim 1, further comprising:
the secondary marketplace, via one or more computing devices, selling the acquired ownership interest in one or more of the user selected ones of the digital media content items to one or more of the potential consumers.

3. The method of claim 1, further comprising:
the secondary marketplace, via one or more computing devices, renting one or more of the digital media content items to the one or more potential consumers for a period of time, for a rental fee.

4. The method of claim 1, further comprising:
the secondary marketplace receiving a subscription fee from one or more subscribers, wherein said subscription fee permits the one or more subscribers to access the digital media content items.

5. The method of claim 1, further comprising:
one or more computing devices performing programmatic actions that ensures the secondary marketplace limits a number of concurrent utilizations of the digital content items in accordance with the acquired ownership interest.

6. The method of claim 1, wherein the portable storage mediums comprise at least a set of one or more DVDs, CDs, or BLU-RAY disks.

7. The method of claim 1, wherein the secondary marketplace provides at least a subset of the user selected ones of the digital media content items for a limited period of time.

8. The method of claim 1, wherein the secondary marketplace rents the user selected ones of the digital media content items to the potential customers.

9. The method of claim 1, further comprising:
the secondary marketplace, via one or more computing device, transferring the ownership interest acquired from the first owners to at least a subset of the potential consumers.

10. The method of claim 1, further comprising:
the secondary marketplace, via one or more computing devices, streaming the one or more user selected ones of the digital media content items to one or more of the potential consumers.

11. The method of claim 1, further comprising;
the secondary marketplace permitting the users to utilize one or more user selected ones of the digital media content items through a Web browser or a software application running on a computing device of the one or more potential consumers.

12. The method of claim 1, further comprising:
a server of the secondary marketplace providing a digital version of user selected ones of the digital content media items over a network, thereby enabling utilization of the user selected ones of the digital content media items.

13. The method of claim 1, wherein the digital content media items comprise one or more of: a set of one or more e-books, a set of one or more audiobooks, a set of one or more songs, and a set of one or more videos.

14. The method of claim 1, wherein the secondary marketplace provides an online auction to sell the acquired ownership interest in the copies of the media content items.

15. The method of claim 1, wherein the secondary marketplace is the second owner.

16. The method of claim 1, wherein at least one of the copies of media content items is a compact disk or other music artifact containing a set of one or more songs, said method further comprising:
the second owner acquiring the compact disk or other music artifact from at least one of the first owners as the corresponding ownership interest is acquired;
the secondary marketplace utilizing the ownership interest of the second owner acquired by the compact disk or other music artifact to enable a single instance of a concurrent utilization of one digital music file by one or more of the potential consumers, wherein said digital music file comprises copyrighted content of the compact disk or other music artifact.

17. The method of claim 1, wherein at least one of the copies of media content items is a digital video disk, a Blu-ray disk, or other video artifact containing a set of one or more videos, said method further comprising:
the second owner acquiring the digital video disk, a Blu-ray disk, or other video artifact from at least one of the first owners as the corresponding ownership interest is acquired;
the secondary marketplace utilizing the ownership interest of the second owner acquired by the digital video disk, a Blu-ray disk, or other video artifact to enable a single instance of a concurrent utilization of one digital video file by one or more of the potential consumers, wherein said digital video file comprises copyrighted content of the digital video disk, a Blu-ray disk, or other video artifact.

18. A computer system comprising:
one or more processors, one or more computer-readable memories and one or more computer-readable, tangible storage devices;
program instructions, stored on at least one of the one or more storage devices for execution by at least one of the one or more processors via at least one of the one or more memories, to record a second owner obtaining a plurality of portable storage mediums from a set of one or more first owners, wherein each of the portable storage mediums comprises a copy of a media content item, wherein media content items stored on the portable storage mediums are subject to a copyright of at least one copyright holder, wherein legal possession of the portable storage mediums represents ownership of a utilization right for the media content items stored therein;
program instructions, stored on at least one of the one or more storage devices for execution by at least one of the one or more processors via at least one of the one or more memories, to record the second owner acquiring an ownership interest in a plurality of copies of media content items stored in the plurality of portable storage mediums from the set of one or more first owners via a transfer of ownership of the portable storage mediums between the second owner and the set of one or more first owners, wherein the first owners have previously purchased one or more portable storage mediums comprising legal copies of the media content items, whereby a first sale doctrine of copyright law or other provision of law exhausts a copyright holder's right to control how ownership of purchased legal copies of the portable storage mediums comprising the plurality of copies of the media content items is able to be disposed of, thereby permitting the owners to convey ownership interest in the portable storage mediums comprising the plurality of copies of the media content items to the second owner;
program instructions, stored on at least one of the one or more storage devices for execution by at least one of the one or more processors via at least one of the one or more memories, to utilize the acquired ownership interest in the plurality of copies of the media content items to provide, via one or more computing devices serving content over a network for a secondary marketplace, potential consumers with a set of digital media content items, wherein a one-to-one correspondence exists between the digital media content items and the copies of the media content items, wherein the secondary marketplace provides the potential customers with a set of digital media content items without any of the portable storage mediums obtained from the set of one or more first owners being conveyed to the potential customers, wherein the secondary marketplace legally provides the set of digital media content items to the potential customers without obtaining permission from the first owner or from any other right-holding-entity, said other right-holding entity being an entity having an acquired or retained copyright right to the media content items; and
program instructions, stored on at least one of the one or more storage devices for execution by at least one of the one or more processors via at least one of the one or more memories, to permit the potential consumers to utilize one or more user selected ones of the digital media content items for a fee, wherein a right by a secondary marketplace to permit the potential consumers to utilize the digital media content items is by virtue of the acquired ownership interests of the second owner in the plurality of copies of the media content items.

19. A computer program product comprising:
one or more non-transitory computer-readable mediums;
program instructions, stored on at least one of the one or more non-transitory computer-readable mediums, to record a second owner obtaining a plurality of portable storage mediums from a set of one or more first owners, wherein each of the portable storage mediums comprises a copy of a media content item, wherein media content items stored on the portable storage mediums are subject to a copyright of at least one copyright holder, wherein legal possession of the portable storage mediums represents ownership of a utilization right for the media content items stored therein;
program instructions, stored on at least one of the one or more non-transitory computer-readable mediums, to record the second owner acquiring an ownership interest in a plurality of copies of media content items stored in the plurality of portable storage mediums from the set of one or more first owners via a transfer of ownership of the portable storage mediums between the second owner and the set of one or more first owners, wherein the first owners have previously purchased one or more portable storage mediums comprising legal copies of the media content items, whereby a first sale doctrine of copyright law or other provision of law exhausts a copyright holder's right to control how ownership of purchased legal copies of the portable storage mediums comprising the plurality of copies of the media content items is able to be disposed of, thereby permitting the owners to convey ownership interest in the portable storage mediums comprising the plurality of copies of the media content items to the second owner;
program instructions, stored on at least one of the one or more non-transitory computer-readable mediums, to utilize the acquired ownership interest in the plurality of copies of the media content items to provide, via one or more computing devices serving content over a network for a secondary marketplace, potential consumers with a set of digital media content items, wherein a one-to-one correspondence exists between the digital media content items and the copies of the media content items, wherein the secondary marketplace provides the potential customers with a set of digital media content items without any of the portable storage mediums obtained from the set of one or more first owners being conveyed to the potential customers, wherein the secondary marketplace legally provides the set of digital media content items to the potential customers without obtaining permission from the first owner or from any other right-holding-entity, said other right-holding entity being an entity having an acquired or retained copyright right to the media content items; and program instructions, stored on at least one of the one or more non-transitory computer-readable mediums, to permit the potential consumers to utilize one or more user selected ones of the digital media content items for a fee, wherein a right by a secondary marketplace to permit the potential consumers to utilize the digital media content items is by virtue of the acquired ownership interests of the second owner in the plurality of copies of the media content items.

20. A method comprising:

acquiring an ownership interest in a plurality of copies of media content items from a set of owners, wherein the owners have previously purchased one or more legal copies of the media content items, whereby a first sale doctrine of copyright law or other provision of law exhausts a copyright holder's right to control how ownership of purchased legal copies of the media content items is able to be disposed of, thereby permitting the owners to convey ownership interest in the plurality of copies of the media content items to another;

a secondary marketplace utilizing the acquired ownership interest in the plurality of copies of the media content items to provide, via one or more computing devices, potential consumers with a set of digital media content items, wherein a one-to-one correspondence exists between the digital media content items and the copies of the media content items; and the secondary marketplace, via one or more computing devices, permitting the potential consumers to utilize one or more user selected ones of the digital media content items for a fee, wherein a right by the secondary marketplace to permit the potential consumers to utilize the digital media content items is by virtue of the acquired ownership interests in the plurality of copies of the media content items from the owners, wherein the secondary marketplace legally permits the set of digital media content items to be utilized by the potential customers without obtaining additional permission from any entity that acquired or retained copyright rights in the media content items before the ownership interest in the copies was acquired, wherein for at least a portion of the media content items, the acquiring of an ownership interest comprises the owners of the portion of media content items physically conveying ownership of a physical artifact, wherein said conveyed physical artifact is not conveyed by the secondary marketplace to the potential consumers that utilize the one or more user selected ones of the digital content media items.

21. A method comprising:

acquiring an ownership interest in a plurality of copies of media content items from a set of owners, wherein the owners have previously purchased one or more legal copies of the media content items, whereby a first sale doctrine of copyright law or other provision of law exhausts a copyright holder's right to control how ownership of purchased legal copies of the media content items is able to be disposed of, thereby permitting the owners to convey ownership interest in the plurality of copies of the media content items to another;

a secondary marketplace utilizing the acquired ownership interest in the plurality of copies of the media content items to provide, via one or more computing devices, potential consumers with a set of digital media content items, wherein a one-to-one correspondence exists between the digital media content items and the copies of the media content items, wherein the secondary marketplace legally permits the set of digital media content items to be utilized by the potential customers without obtaining additional permission from any entity that acquired or retained copyright rights in the media content items before the ownership interest in the copies was acquired; and the secondary marketplace, via one or more computing devices, permitting the potential consumers to utilize one or more user selected ones of the digital media content items for a fee, wherein a right by the secondary marketplace to permit the potential consumers to utilize the digital media content items is by virtue of the acquired ownership interests in the plurality of copies of the media content items from the owners, wherein the secondary market permits the potential consumers to utilize the selected ones of the digital media content for a fee by:

renting one or more of the digital media content items to the one or more potential consumers for a period of time, for a rental fee; or by receiving a subscription fee from the one or more potential consumers, wherein the subscription fee permits the potential customers to utilize the one or more digital media content items for a subscription period, wherein in absence of the subscription fee the secondary marketplace does not permit the potential consumers to utilize the one or more digital media content items.

* * * * *